United States Patent [19]

Weston, Jr.

[11] 3,885,487

[45] May 27, 1975

[54] SETWORKS CONTROL FOR SAWMILL

[76] Inventor: Clement Walker Weston, Jr., 4819 Baudin St., New Orleans, La. 70150

[22] Filed: Feb. 25, 1974

[21] Appl. No.: 445,142

[52] U.S. Cl. ............................... 83/728; 192/3 R
[51] Int. Cl. .......................................... B27b 29/10
[58] Field of Search ..................... 83/728, 722, 727; 192/142 R, 3 R

[56] References Cited
UNITED STATES PATENTS

| | | | |
|---|---|---|---|
| 3,380,495 | 4/1968 | Weston | 83/728 |
| 3,589,482 | 7/1971 | Weston | 92/3 R |

*Primary Examiner*—Donald R. Schran
*Attorney, Agent, or Firm*—B. P. Fishburne, Jr.

[57] ABSTRACT

An electronically controlled setworks for automatically advancing the head block or "knees" of a sawmill carriage a predetermined adjustable distance with respect to the saw line. Electronic analog circuit means compares a DC signal indicative of the actual linear forward travel or position of the head blocks on a sawmill carriage against a plurality of selected DC reference signals whereby a controlled slow-down and stopping of the carriage head blocks is effected.

20 Claims, 4 Drawing Figures

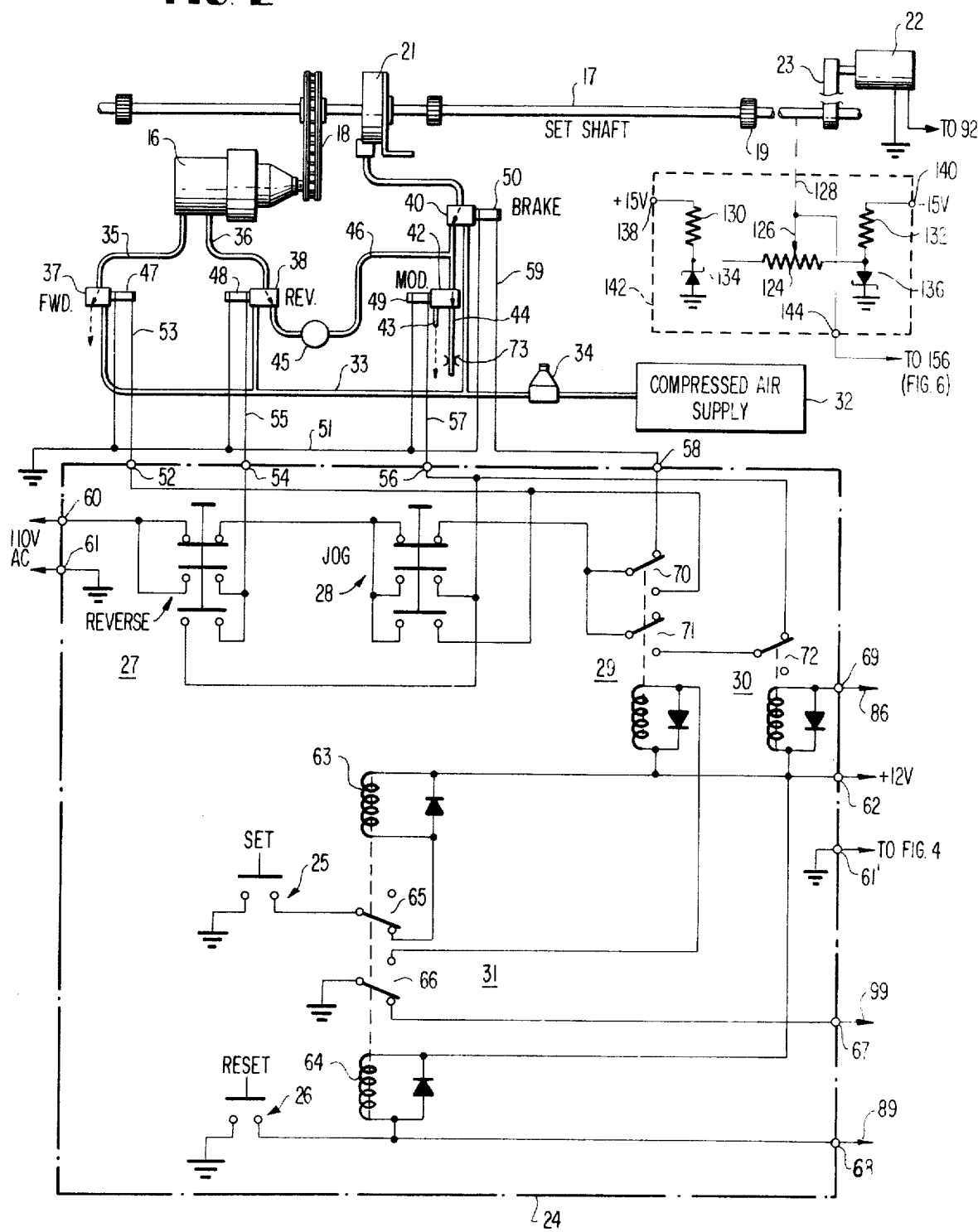

SETWORKS CONTROL FOR SAWMILL

BACKGROUND OF THE INVENTION

This invention relates to sawmill systems and more particularly to an electronically controlled combined indexing and canting sawmill setworks.

The function of a sawmill setworks is to control the motion of a log so that it can be moved in relation to a saw blade a finite predetermined distance with a high degree of reliable accuracy. On a sawmill carriage, this action is always considered in the question of advancing or selectively positioning the head blocks or "knees" of the carriage relative to the saw line.

The present invention constitutes an improvement in electronic setworks control for sawmills as disclosed in U.S. Pat. Nos. 3,380,495 and 3,589,482 issued to the present inventor, C. W. Weston, Jr., on Apr. 30, 1968 and June 29, 1971, respectively.

In the first-mentioned Weston patent, there is described a digital electronic setworks control for sawmills which, when a "set" was initiated, the brake on the set shaft was released and an air motor proceeded to drive the head blocks at high speed. A digital signal generator was coupled to the air motor and provided a series of pulses, the number of which was indicative of the linear movement of the head blocks. A digital totalizer was also provided which counted the pulse output from the transducer to provide a first output signal in accordance with a first predetermined number of pulses counted to decelerate the setworks approximately ½ inch from the completion of the set and then provided a second output signal in accordance with a second predetermined number of pulses to stop the setworks at the desired setting. The electronics circuitry accordingly signalled the air motor first to slow down by applying low pressure braking to the set shaft and as the set was completed, a high pressure air supply was ducted to the brake, locking the set shaft in the final position at the completion of the set.

The second Weston patent was directed to an air operated motor and brake system for a sawmill setworks which included a modulating control of the system. Such a system also included an air motor for driving the set shaft and an air brake. The air brake has its operation modulated during deceleration so that with a large heavy log, deceleration will be relatively little, whereas with a lighter log, deceleration will be relatively great. The modulation of the brake was accomplished by detecting speed according to the volume of exhaust air flowing from the air motor. A back pressure was imposed upon the motor which provides simulated loading of the system when activation of the air brake was desired.

SUMMARY

Briefly, the subject invention is directed to an analog control system having particular utility in connection with the sawmill setworks described in the second-mentioned Weston U.S. Pat. No., 3,589,482, but is not limited to use with such structure. In the subject analog setworks, the set shaft is mechanically coupled to a signal generator, the instantaneous output voltage of which is proportional to the speed of its rotation, providing a precision measure of the head block velocity or is indicative of head block position. The DC signal in one mode of operation is fed to the input of an integrator circuit which provides an output voltage corresponding to the linear distance traveled by the head blocks. The output of the integrator is fed to an electronic comparator circuit where the instantaneous output voltage of the integrator is compared to at least one previously established DC reference voltage selected by the sawyer which represents the total distance which the head blocks are to be moved for a particular set. When the reference voltage and the integrator output voltage are equal, the comparator provides a control output which is coupled to the prime mover braking means to effect locking of the knees from further advance. The comparator also provides means for the introduction of a second DC reference voltage which is used to command the prime mover to decelerate in preparation for the final stop. When desirable, a third DC reference voltage can be introduced to provide a minor modification of the desired travel of the head blocks to compensate for such things as variation in saw kerf. Thus, at the outset of a "set," high speed operation of the prime mover is commanded whereupon the head blocks begin to advance to the saw line. As the measured desired increment of travel nears completion, dynamic braking is commanded in inverse proportion to the load seen by the prime mover and finally with speed greatly reduced, the brake is tightly set to lock the head blocks from further advance in accordance with a setting selected by the sawyer. In the second mode of operation, a DC signal proportional to the actual position of the head block knees relative to the saw line is fed to the comparator input exclusive of the output of the integrator for providing the canting function.

BRIEF DESCRIPTION OF THE DRAWINGS

FIG. 2 is an electromechanical schematic diagram illustrative of the brake modulating system and electrical controls therefor incorporated in the subject invention.

DESCRIPTION OF THE PREFERRED EMBODIMENT

Figure 1:
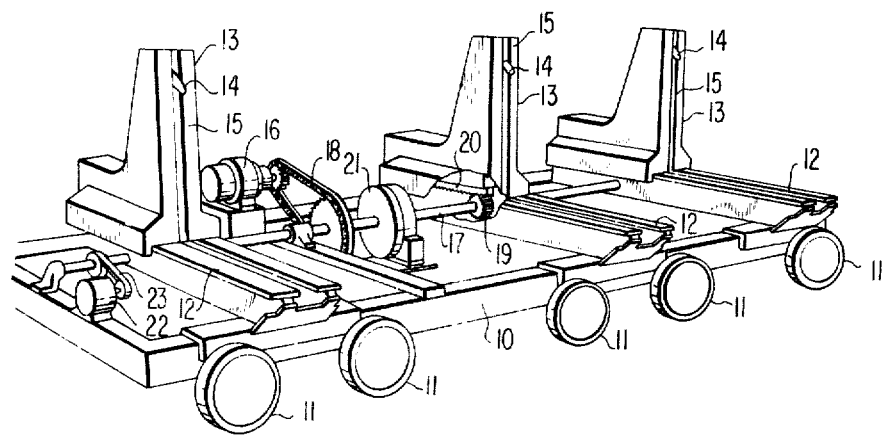
FIG. 1 is a fragmentary perspective view of a sawmill carriage and setworks as set forth in U.S. Pat. No. 3,589,482.

Referring now to the drawings wherein like numerals designate like parts throughout, the numeral 10 designates a sawmill carriage having wheels 11 engaging a track or guide, not shown. Head block guides 12 are provided on the carriage and a corresponding number of head blocks 13 slidably engage these guides. The head blocks are equipped with the usual dogs 14 which grip the log, now shown, carried on the guide or bases 12, and resting against the vertical faces 15 of the head blocks. The machine further comprises an air motor 16 suitably mounted on the carriage and is coupled to a set shaft 17 through the gearing 18. The set shaft 17 carries a spur gear 19 beneath each head block 13 to drive the latter by meshing with a gear rack 20 on the bottom thereof. An air brake 21 of a known type is located on the set shaft 17 to control the linear movement of the head block 13 upon command by arresting rotation of the set shaft. The construction thus far described is conventional and corresponds substantially to the description of the corresponding parts in U.S. Pat. No. 3,589,482.

Figure 3:
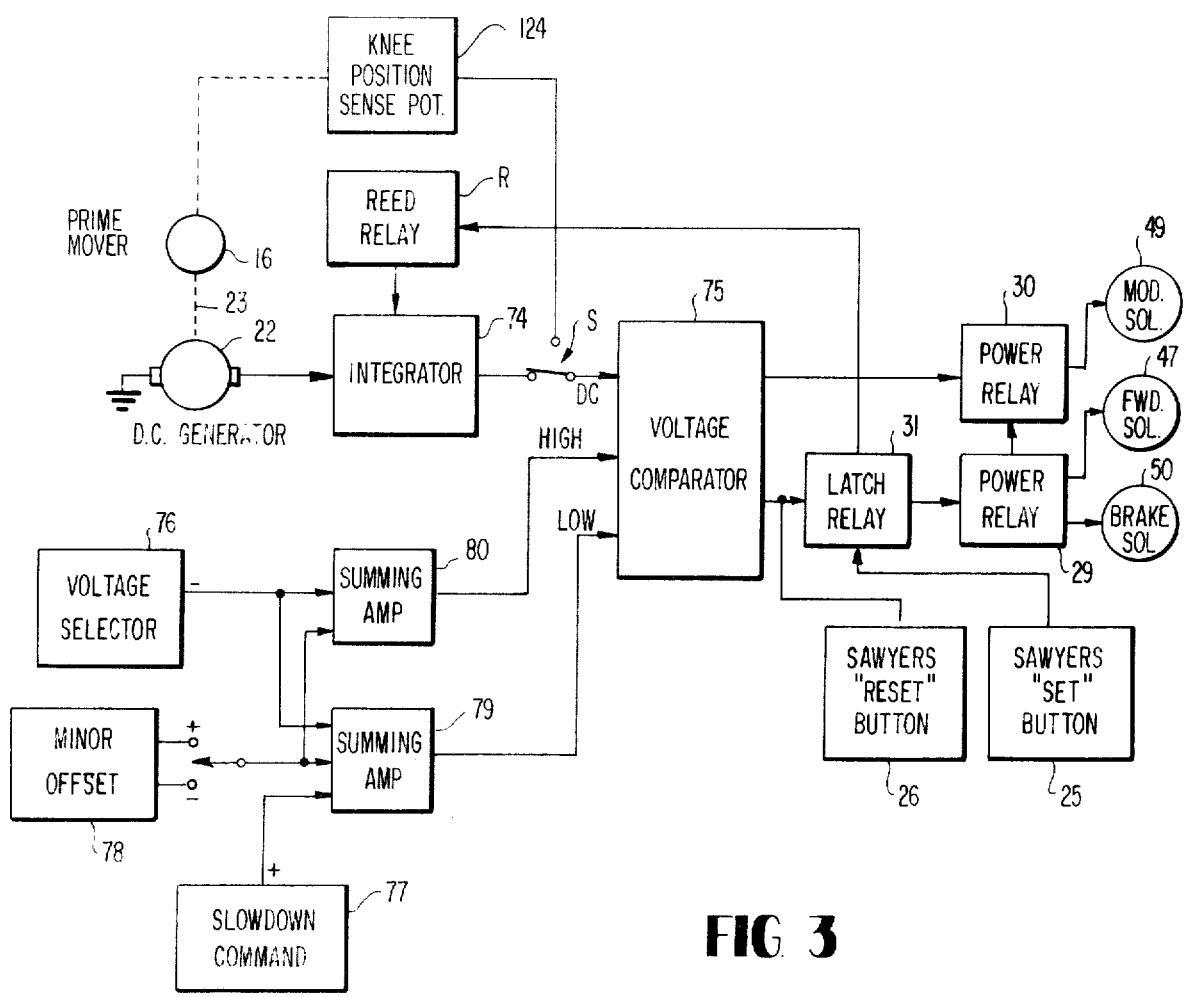
FIG. 3 is an electrical block diagram illustrative of the preferred embodiment of the present invention.

In addition, however, the present invention includes a DC tachometer generator 22 and a knee position sensing potentiometer shown in FIG. 3 suitably located on the carriage 10, being mechanically coupled to the set shaft 17 by a suitable mechanical coupling shown schematically in FIG. 1 by reference numeral 23. The only requirement with respect to the tachometer generator and potentiometer is that it be coupled to the set shaft 17 and therefore its physical location is at the discretion of the designer.

Prior to discussing the electrical control circuitry which comprises the subject invention, a brief discussion of the brake modulating system taught by U.S. Pat. No. 3,589,482 will be considered for purposes of illustration, it being pointed out that when desirable, any other type of suitable braking system can be utilized, making use of suitable modifications well known to those skilled in the art. The brake modulating system taught by U.S. Pat. No. 3,589,482 and preferably utilized by the subject embodiment is based upon detection of speed in accordance with the volume of exhaust air flowing from the air motor 16 which comprises the prime mover. If the motor 16 is lightly loaded, compressed air flowing therethrough will undergo a relatively small pressure drop through the motor and experience a much larger pressure drop in the exhaust side valving. Conversely, a heavily loaded air motor will show a great pressure drop across the motor and a low drop across the valving on the exhaust side. The deceleration period necessitates the imposition of back pressure on the motor which will produce a synthetic or simulated loading of the system. At the same time, inflation of the air brake is desired. The essence of the system is to utilize these two requirements simultaneously and by means of the same valving. When the air motor 16 is lightly loaded, it will be seen that a large volume of air will escape on the exhaust side of the motor. If an obstruction to this exhaust is suddenly imposed however, e.g. by the valving, the pressure will build up very rapidly on the exhaust side, tending to slow the motor. This pressure will simultaneously be applied to the air brake 21 which will further act to slow the motor. The amount of back pressure may diminish as the air motor is slowed. For example, if the load on the head blocks should suddenly meet an increase in friction at it slides on the carriage ways, such a load could cause the motor to approach a stall, whereupon the back pressure which would then be imposed on the motor and the air brake would diminish automatically to nearly zero. Under this condition, the air motor is free to impose full torque on the set shaft in order to complete the set.

The electrical circuit arrangement by which brake modulation is carried out is shown in FIG. 2, wherein the air motor 16 and the air brake 21 are controlled by means of a switch and relay assembly 24 which includes a push button "set" switch 25, a push button "reset" switch 26, a push button "reversing" switch 27, a forward "jogging" switch 28, a pair of DC operated power relays 29 and 30, and a DC operated latching switch 31. The air motor 16 and the air brake 21 are powered by compressed air from a supply source 32 through an air line 33 having a main control valve 34 therein. As shown, the line 33 is connected with the motor 16 through branch air lines 35 and 36 having respective "forward" and "reverse" solenoid operated valves 37 and 38 therein. The brake 21 for shaft 17 is similarly connected to the main air line 33 through a branch line 39 having a "brake" solenoid operating valve 40 connected therein. An exhaust line 41 leading from the brake valve 40 is connected to a "brake modulating" solenoid valve 42 having an open exhaust line 43 and a variable back pressure exhaust line 44 by means of which deceleration of the head blocks is regulated under certain operating conditions. A one way check valve 45 is coupled in an air line 46 connected between the air line 41 coming from the valve 40 and "reverse" valve 38.

The operation of the valves for providing forward and reverse motion of the set shaft 17 with a modulated braking action is exactly as described with respect to U.S. Pat. No. 3,589,482. The circuitry for energizing these air valves in the present embodiment, however, is different. More particularly, each of the valves 37, 38, 40 and 42 have respective electrically actuated solenoids 47, 48, 49 and 50 associated therewith. Each of the solenoids has one terminal coupled to a point of reference potential illustrated as "ground" through a ground buss 51. The other terminal of solenoid 47 is coupled to terminal 52 of the switch and relay assembly 24 by means of circuit lead 53. Similarly, the other terminal of solenoid 48 is connected to terminal 54 by means of circuit lead 55, the other terminal of solenoid 49 is connected to terminal 56 by means of circuit lead 57 and finally, the other terminal of solenoid 50 is connected to terminal 58 by means of circuit lead 59.

The operating circuitry for the solenoids is embodied in the assembly 24 which is adapted to selectively couple 110 volt AC line voltage to the various solenoids. This line voltage is applied as an input across assembly terminals 60 and 61. The DC operated relays 29, 30 and 31 include DC operated solenoids and accordingly a +12 volt DC supply potential therefor is coupled from a source, not shown, to assembly terminal 62. The solenoids for these relays are adapted to be energized when the opposite ends of the respective solenoids are grounded. For example, the latching relay 31 includes two solenoids 63 and 64, the first of which is adapted to be grounded through the "set" switch 25, whereas the other solenoid 64 is adapted to be grounded through the "reset" switch 26. Thus, the solenoid 63 when activated by the "set" switch 25 is adapted to move the relay contacts 65 and 66 in a first direction only while the solenoid 64 when activated by the "reset" switch 26 is adapted to cause the switch contacts 65 and 66 to move in the reverse direction.

With regard to the solenoid of power relay 29, it is adapted to be grounded through relay contacts 66 when the "set" switch 25 is closed and solenoid 63 is energized. When the "reset" switch 26 is closed, on the other hand, solenoid 64 will be energized causing power relay 29 to be deenergized and relay contacts 66 will provide a ground at assembly terminal 67 for coupling to the analog circuitry shown in FIG. 4. Latch relay solenoid 64 will also be energized when ground potential appears at assembly terminal 68 which is applied from the analog circuitry shown in FIG. 4 subsequently described. In the same manner, the solenoid for power relay 30 will be energized when ground potential is applied to assembly terminal 69 from the analog circuitry shown in FIG. 4.

During system "stand-by," the 110 volt AC line voltage is coupled through the normally closed switch contacts of the "reverse" and "jog" switches 27 and 28 and through the normally closed switch contacts 70 of power relay 29 causing the brake solenoid 50 to be energized. In the event it becomes desirable that the sawmill head blocks are to be driven in the reverse direction, the sawyer depresses the "reverse" switch 27 whereupon both sets of normally open switch contacts would be closed and the 110 volt line voltage will be applied to the reverse valve solenoid 48 and to the modulating brake valve solenoid 49. In the event that the sawyer merely wishes to jog or increment the blocks forward, the "jog" switch 28 would momentarily be depressed and the 110 volt line voltage would be coupled to the forward valve solenoid 47 and the modulating valve solenoid 49. The same condition would be accomplished when a "set" is initiated by depressing the "set" push button 25, causing power relay 29 to become energized through latch relay contacts 66. When power relay 29 is energized, the 110 volt line voltage is applied to the forward valve solenoid 47 through relay contacts 70 while the modulating valve solenoid 49 is energized through relay contacts 71. Thus in the forward mode of operation, both solenoids 47 and 49 are energized, which permit air to flow from the compressed air supply into the motor 16 through the line 35 and out through line 36 into the reverse valve 38 which is in the unenergized position as shown, whereupon air flow continues through the check valve 45 to the unimpeded exhaust line 43 of the modulating valve 42.

In the reverse direction, air flows into the air motor through the reverse valve 38 by means of air line 36 and out through line 35 to the valve 37 where it exits from the deenergized open port thereof. Slow down is achieved in the forward direction by deenergizing the modulating brake valve solenoid 49 by means of the power relay 30 which when energized opens the normally closed relay contacts 72. Exhaust air from the air motor 16 now must pass through the modulating brake valve 42 to the output line 44 which terminates in a restrictor valve 73 causing a back pressure to be built up which is coupled through the deenergized brake valve 40 to the air brake 21. For a more detailed description of the braking action, one should refer to the description of U.S. Pat. No. 3,589,482.

Figure 4:
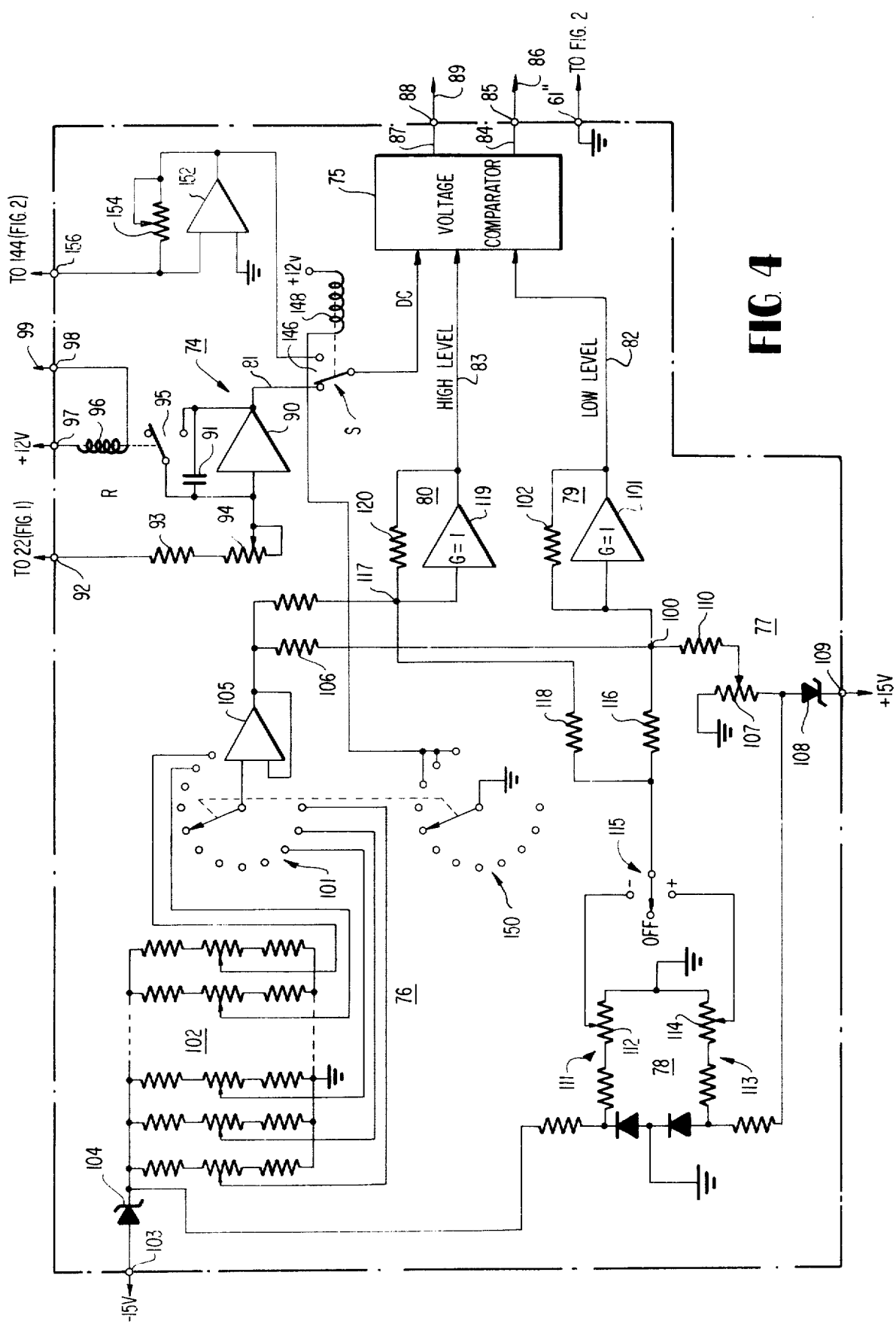
FIG. 4 is an electrical schematic diagram of the analog setworks control circuitry.

The present invention is directed to the analog setworks circuit means for energizing the power relay 30 when slow-down of the setworks is required after a set has been initiated by the sawyer upon his pressing the "set" button 25, whereupon latch relay solenoid 63 is momentarily energized causing power relay 29 to energize and for energizing the solenoid 64 of the latch relay 31 when a predetermined linear travel of the sawmill head blocks has occurred. The analog circuit means for automatically controlling the setting operation is shown in block diagram form in FIG. 3 while an electrical schematic diagram therefor is illustrated in FIG. 4. Referring now to FIG. 3, the setworks as noted above include a DC tachometer generator 22, the instantaneous output voltage of which is precisely proportional to the speed of rotation of the prime mover 16. Accordingly, the output voltage of the tachometer generator 22 is a precision measure of the head block velocity as it advances to a set since both are coupled to the same set shaft 17. The tachometer generator output is fed to the input of an integrator circuit 74 which is operable to compute the integral of the velocity for a predetermined time period to yield the distance traveled of the head blocks 13. The integrator 74 then provides an output voltage which is a function of the distance traveled by the head blocks. The output voltage of the integrator circuit is fed through normally closed switch contacts S to an electronic comparator circuit 75 which receives a separate low and high level DC reference voltage applied as the result of the sawyer manually selecting the width of saw cut desired which results from manually operating a voltage selector circuit 76, setting the voltage output of a slow down command circuit 77, and when desirable setting and selecting a predetermined polarity voltage from a minor offset reference circuit 78 to adjust for such things as saw kerf. These three DC voltages are fed to a buffer amplifier 79 which includes a summing point, not shown, at its input to provide first or low level reference to the voltage comparator 75, which when the output of the integrator circuit 74 equals or exceeds the low level reference, provides an output in the form of a circuit ground to the power relay 30 which causes the relay to become energized and as indicated above, causes the modulating valve solenoid 49 to become deenergized.

The output of the voltage selector 76 and the minor offset voltage selected by the circuit 78 is fed to a second buffer amplifier 80 which includes a second summing point, not shown, at its input to provide the second or high level reference voltage which when the output of the integrator 74 equals it, causes a circuit ground to be coupled to the solenoid 64 of the latch relay 31 which has the effect of deenergizing power relay 29 whereupon relay contacts 70 shown in FIG. 2 energizes the brake valve solenoid 50 causing the setworks to stop further advancement. A reed relay R is coupled to the integrator circuit 74 and is adapted to close at the end of the set to reset the integrator circuit 74 in preparation for a new cycle of operation.

While the block diagram shown in FIG. 3 broadly discloses the analog setworks control, FIG. 4 discloses the preferred embodiment of the circuitry contemplated. Referring now to FIG. 4, the comparator circuit 75 comprises voltage level sensing circuitry which compares the varying DC input signal applied from the integrator circuit 74 over circuit lead 81 and the normally closed relay switch contacts S against the low and high DC reference voltages applied over circuit leads 82 and 83 from the buffer amplifiers 79 and 80, respectively. The comparator circuit itself can be of any selected type of electrical or electronic circuit which when a certain reference level is reached, changes output stage. A typical example of such a circuitry is a Schmitt trigger circuit. Therefore, when desirable, the comparator circuit 75 may be comprised of a pair of Schmitt trigger circuits which is operable such that when the DC input voltage appearing on circuit lead 81 matches the DC reference voltage appearing on circuit lead 82, an output signal appearing on circuit lead 84 goes from a binary high level to a low level (i.e. ground potential). Output circuit lead 84 from the comparator 75 is coupled to an output terminal 85 which is adapted to be connected to terminal 69 of the assembly 24 shown in FIG. 2 by means of circuit lead 86. In a like manner when the DC input voltage on circuit lead 81 equals the DC reference potential appearing on circuit lead 83, the signal appearing on output circuit lead 87 goes from a binary high value to a binary low value. Output circuit lead 87 is connected to termnal 88 which is connected to terminal 68 of the assembly 24 by means of circuit lead 89.

The DC input to the comparator 75 which appears on circuit lead 81 as noted before, results from an integration of the Dc output from the tachometer generator 22 coupled to the set shaft 17. The integrator circuit 74 is comprised of a DC operational amplifier 90 of a known type having an integrating capacitor 91 coupled between the output and the input thereof. This type of integrator circuit is well known to those skilled in the art, being typical of a Miller integrator circuit. The input to the operational amplifier 90 is applied from terminal 92 which is directly connected to the tachometer generator by means of the resistive coupling provided by the fixed resistor 93 and a rheostat 94. A set of normally open relay contacts 95 actuated by the reed relay solenoid 96 is coupled directly across the capacitor 91 for discharging the voltage on the capacitor when the contacts 95 are closed at the end of a set which is accomplished by energizing its solenoid. This is accomplished by coupling one side of the solenoid 96 to terminal 97 to which a +12 volt DC potential is applied while the ground return side of the solenoid is coupled to terminal 98. Terminal 98 is directly connected to relay contacts 66 of the latch relay 31 (FIG. 2) by means of circuit lead 99 connected to assembly terminal 67.

The first or low level DC reference voltage is generated by applying the three separately selected DC voltages noted above to an algebraic summing point 100 which is at the input of the buffer amplifier 79 comprised of a unity gain operational amplifier 101 having a feedback resistor 102. The first input to the summing point 100 provided from the voltage selector system 76 which is comprised of a rotary switch 101, sequentially coupled to a plurality of resistive voltage divider circuits 102 coupled across a regulated voltage of negative polarity provided by a −15 volt DC voltage coupled to terminal 103 and Zener diode 104. Each voltage divider provides a respective negative voltage corresponding to a particular set capability of the setworks. The rotary switch 101 is coupled to an operational amplifier 105 whose output is connected to the summing point 100 by means of a fixed summing resistor 106. The second input to the summing point 100 comprises a slow down command reference signal which is developed from a regulated positive DC voltage picked off the slider element of a potentiometer 107 coupled to a Zener diode 108 connected in turn to terminal 109 to which is applied a +15 volt DC supply potential from a source not shown. The slider of potentiometer 107 applies a positive potential to the summing point 100 through a fixed summing resistor 110 and is opposite in sign (i.e. polarity) from the negative polarity voltage coupled from the selector switch 101 through resistor 106. The difference voltage at the summing point 100 is fed through the buffer amplifier 79, the output of which comprises the DC reference voltage of lower magnitude for initiating slow down of the setworks prior to the stopping distance selected by the sawyer by operation of the switch 101. The third voltage is applied to the summing point 100 in order to provide a minor offset reference voltage to account for such things as saw kerf which is the set error resulting from the saw dust generated in the sawing operation. This dimension differs according to thickness and condition of the saw blade. The offset circuit 78 provides either a positive or negative offset reference voltage by means of a first voltage divider 111 including a potentiometer 112 coupled between the regulated −15 volts supply potential and ground while a positive voltage is provided by a second voltage divider 113 including set potentiometer 114 coupled between the +15 volt regulated supply potential and ground. A switch 115 is coupled to the sliders of potentiometers 112 and 114 and is thus able to provide either a positive or a negative increment of voltage to the summing point 100 by means of the fixed summing resistor 116.

The switch 115 is also coupled to a second summing point 117 by means of the fixed summing resistor 118 which is at the input of the buffer amplifier 80 comprised of a unity gain operational amplifier 119 and a feedback resistor 120. Thus the minor offset reference is either added to or subtracted from the higher or upper level DC reference voltage appearing on circuit lead 83 to the comparator circuit 75.

Considering now the overall operation of the subject invention, the sawyer wanting a specified set first adjusts the set selector switch 101 shown in FIG. 4 to the width of cut desired. This switch, moreover, is positioned at the operator station off the carriage 10 where setting takes place. The sawyer briefly pushes the set switch 25 shown in FIG. 2 which energizes latch relay solenoid 63 causing relay contacts 65 and 66 to switch, opening relay contacts 65 while relay contacts 66 ground the solenoid of the power relay 29 and opening the circuit of the solenoid 97 (FIG. 4) which removes the short circuit across the integrating capacitor 91. Opening of relay contacts 95 across the capacitor 91 renders the integrator 74 ready for measuring the DC output of the tachometer generator 22. The grounding of the solenoid of power relay 29 energizes the relay, causing relay contact 70 to remove the 110 volt AC line voltage from the brake valve solenoid 50 and transfers it to the forward valve solenoid 37. Simultaneously, relay contacts 71 couple the 110 volt AC line voltage to the modulating valve solenoid 49. The air motor 16 receives air from the compressed air supply 32 and begins to rotate, rapidly accelerating to high speed. As the knees or head blocks 14 move forward, the DC tachometer generator 22 is rotated and its DC output voltage is fed to the integrator 74. The output voltage of the integrator 74 which appears on circuit lead 81 is fed to the comparator 75. The comparator circuit 75 monitors the integrator output continuously such that when the integrator output is equal to the first or lower DC reference appearing on circuit lead 82, plus or minus any minor offset reference voltage provided by the circuitry 78 shown in FIG. 4, the comparator output level on circuit lead 84 goes to ground potential which energizes power relay 30, opening up relay contacts 72. This action deenergizes the modulating valve solenoid 49 causing a controlled braking to the carriage head blocks 14 as noted earlier, and calls for a lower forward speed of the prime mover 16 due to the back pressure built up. The set proceeds under the relatively low speed condition with the voltage at the output of the integrator 74 increasing as the movement of the head blocks progresses. When the output of the integrator is equal to the second or upper reference voltage appearing on circuit lead 83, the output level on circuit lead 87 from the comparator 75 goes to ground potential, whereupon solenoid 64 of the latching relay 31 is energized. Relay contacts 66 immediately switch deenergizing the solenoid of the power relay 29 causing relay contacts 70 to apply the 110 volts AC line potential to the brake valve solenoid 50 causing the setworks to halt movement. Relay contacts 66 of the latch relay 31 acts to provide a ground return for the solenoid 96 of the relay R causing the relay contacts 95 to short the integrating capacitor 91 and thus resetting the integrator for the next set. Relay contacts 65 of the latch relay 31 are also again closed, thereby again enabling the set switch 25. This completes the set and the system is back in a "stand-by" state.

It is significant to note that the embodiment of the analog circuitry shown in FIG. 4 provides a means whereby the length of deceleration travel may be quickly and easily varied, it only being necessary to adjust the setting of the potentiometer 107. Such a variation in the digitally controlled setworks shown in U.S. Pat. No. 3,380,495 was extremely difficult to achieve but here it can be shortened and lengthened an infinite degree and also the minor reference offset circuitry 78 makes available a wide selection of minor modifications to command movements of the setworks to compensate for such things as variations in saw kerf. Thirdly, it should be pointed out that the prime mover need not be an air motor, nor do the controls need to be pneumatic. Similar controls can be provided for either electrical, hydraulic or other types of prime movers.

What has been considered thus far is an indexing setworks. The present invention also has for its object the provision of a canting type setworks. To this end, a knee or head block position device is utilized in place of the DC generator 22 and the integrator 74 described above. Referring now to the figures, a potentiometer shown by reference numeral 124 in FIG. 2 is mounted on the carriage 10 shown in FIG. 1 and has its wiper or voltage tap 126 mechanically coupled to the set shaft 17 by suitable mechanical means 128 which may be, for example, a chain and sprocket arrangement such as shown by reference numeral 18. A positive and a negative regulated voltage is respectively applied to each end of the potentiometer 124 by means of the fixed resistors 130 and 132 and the Zener diodes 134 and 136. The positive voltage is applied to terminal 138 while the negative voltage is applied to terminal 140. The components are mounted on the assembly 142. An analog voltage thus indicative of the head block position relative to the saw line is provided at the voltage tap 126 and at terminal 144 of the assembly 142.

The potentiometer 124 is shown generally in FIG. 1 coupled to the prime mover 16 which is equivalent to being coupled to the set shaft; however, what is intended to be shown is that the DC voltage pick off from the potentiometer 124 is coupled to the input of the voltage comparator 75 through the normally open switch contacts S indicating that in the indexing mode of operation, the integrator 74 is coupled to the voltage comparator 75 while in the canting mode the potentiometer 124 is coupled thereto.

The switch contacts S in reality comprise a set of relay contacts 146 actuated by the solenoid 148, as shown in FIG. 4. A rotary switch 150 mechanically coupled to rotary switch 101 has the last three switch contacts, counting clockwise, connected to the solenoid 148 for energization since one side of the solenoid is connected to the +12 volt supply potential applied at terminal 97. This then acts to switch functions from the index mode to the cant mode, the canting mode being the last three switch positions. The last three switch positions of rotary switch 101 also supply selected reference position voltages for the canting mode in the same manner as previously described. It should be noted that the rotary switches 101 and 150 preferably comprise separate decks of the same switch.

It is thus seen that when the rotary switch is turned to a canting position, the output of the integrator 74 is disconnected from the voltage comparator 75; however, the relay contacts 146 couple the output of a buffer amplifier 152 thereto since solenoid 148 is energized. The amplifier 152 includes a variable feedback resistor 154 for gain adjustment. The input of the amplifier 152 is connected to terminal 156 which is adapted to be connected to the voltage tap 126 of position sensing potentiometer 124 shown in FIG. 2.

By suitable adjustment of the gain control i.e., variable resistor 154, it is possible to make the output of amplifier 152 change at a rate that is completely compatible with the total knee travel on any given carriage. The operation of this additional circuitry is basically the same as that previously described with the exception of the operation of the DC tachometer generator 22 and the integrator 74. What is important, however, is that the deceleration feature, implicit in the indexing setworks mode, is carried over into the canting mode. This provides smooth operation of the head blocks with loads of any size and with high repeatable accuracy.

Finally, it should be pointed out that at the end of every cant operation the integrator capacitor 91 is fully discharged by the relay contacts 95 as before, so that the sawyer is free to switch to the index mode without any delay or problem if he so chooses.

It is to be understood that the forms of the invention herewith shown and described are to be taken as preferred examples of the same, and that various changes in the shape, size and arrangement of parts may be restored to, without departing from the spirit of the invention or scope of the subjoined claims.

I claim:

1. An electronically controlled setworks for automatically positioning the head blocks of a sawmill, comprising, in combination:
   prime mover means coupled to the head blocks of a sawmill carriage for selectively advancing and retracting the head blocks in response to command signals applied to said prime mover means;
   means coupled to said prime mover means for providing a DC output signal which is a function of the linear velocity of said head blocks on said carriage;
   electrical signal integrator circuit means coupled to said DC output signal means and being responsive to the output thereof for a predetermined time to provide a DC output signal the magnitude of which is proportional to the distance said head blocks move on said carriage;
   selector circuit means providing a plurality of first DC output signals, each of which has a magnitude calibrated to the desired plurality of widths of cut by said sawmill;
   comparator circuit means coupled to the output signal from said integrator circuit means and a selected first DC output signal from said selector circuit means and providing a control output signal when said DC output signal equals said selected first DC output signal; and first circuit means responsive to said control output signal coupled between said comparator circuit means and said prime mover means, applying a first command signal to said prime mover means to stop advancement of said head blocks in response to said control output signal.

2. The setworks as defined by claim 1 wherein said means for providing a DC output signal which is a function of the linear velocity of said head blocks comprises DC generator means.

3. The setworks as defined by claim 2 wherein said integrator circuit means includes an integrating capacitor and additionally including normally inoperative discharge means coupled across said integrating capacitor and being operated by said first circuit means when said command signal is applied to said prime mover means to discharge said integrating capacitor.

4. The setworks as defined by claim 2 and additionally including:
second circuit means providing a selectively variable second DC signal having a polarity opposite from that of said selected first DC output signal from said selector circuit means;
summing circuit means coupled to said selector circuit means and said second circuit means and being operable to provide a first reference signal coupled to said comparator circuit means which is the algebraic sum of said selected first DC output signal and said second DC signal wherein said comparator circuit means provides another control output signal when said DC output signal from said integrator circuit equals said first reference signal from said summing circuit means; and
third circuit means, responsive to said another control output signal coupled between said comparator circuit means and said prime mover means, applying a second command signal to said prime mover means prior to said first recited command signal to slow advancement of said head blocks.

5. The setworks as defined by claim 4 wherein said signal integrator circuit means comprises an electronic integrator circuit having an integrator capacitor coupled therein, and additionally including circuit means for discharging said integrator capacitor when advancement of said head blocks is stopped upon applying said first command signal to said prime mover means.

6. The invention as defined by claim 5 wherein said electronic integrator circuit comprises an operational amplifier having said integrating capacitor coupled thereto as a feedback capacitor between the output and input of said operational amplifier, and wherein said circuit means for discharging said integrating capacitor comprises a set of normally open relay contacts and including circuit means for rendering said relay contacts closed in response to operation of said first circuit means applying said first command signal to said prime mover means to stop advancement of said head blocks.

7. The setworks as defined by claim 4 wherein said selector circuit means comprises a plurality of voltage divider networks coupled across a DC voltage source of first polarity, each having an adjustable voltage tap and a manually operable selector switch having a plurality of fixed switch contacts respectively connected to the plurality of voltage taps and a movable switch contact coupled to said comparator circuit means and said summing circuit means,
and wherein said second circuit means comprises a potentiometer coupled across a DC voltage of opposite polarity and having an adjustable voltage tap coupled to said summing circuit means.

8. The circuit as defined in claim 7 wherein said summing circuit means comprises first and second resistor means respectively coupled from said movable switch contact and said adjustable voltage tap of said potentiometer to a summing point.

9. The setworks as defined by claim 4 and additionally including fourth circuit means providing a third DC signal, said third DC signal being selectively adjustable and of either polarity, and
second summing circuit means coupled to said selector circuit means and said fourth circuit means providing said third DC signal and being operable to provide a second reference signal coupled to said comparator circuit means which is the algebraic sum of said selected first DC output signal and said third DC signal wherein said comparator circuit provides said control output signal when said DC output signal from said integrator circuit equals said second reference signal.

10. The circuit as defined by claim 9 and additionally including circuit means coupling said third DC signal to said first recited summing circuit means.

11. The setworks as defined by claim 10 and additionally including buffer amplifier means coupled between said first and second summing circuit means and said comparator circuit means.

12. The setworks as defined by claim 11 wherein said first summing circuit includes a summing point and additionally including respective resistance means coupled from said selector circuit means, said second circuit means and said fourth circuit means to said summing point,
and wherein said second summing circuit means includes another summing point and additionally including respective resistance means coupled from said selector circuit means and said second circuit means to said another summing point.

13. The invention as defined by claim 1 and additionally including:
means coupled to said prime mover for providing a DC output signal which is an electrical analog signal representative of the head blocks position on said carriage relative to the saw line;
switch means selectively disconnecting said integrator circuit from said comparator circuit means and connecting the last-recited DC output signal thereto; and
wherein said selector circuit means provides a plurality of second DC output signals, each of which has a magnitude calibrated to a respective plurality of desired canting positions of said head blocks.

14. The setworks as defined by claim 13 and additionally including:
second circuit means providing a selectively variable DC signal having a polarity opposite from that of said plurality of second DC output signals from said selector circuit means;
summing circuit means coupled to said selector circuit means and said second circuit means and being operable to provide a first reference signal coupled to said comparator circuit means which is the algebraic sum of a selected one of said plurality of second DC output signals and said DC signal from said second circuit means wherein said comparator circuit means provides another control output signal when said DC output signal from said means providing said electrical analog signal equals said first reference signal from said summing circuit means; and third circuit means, responsive to said another control output signal coupled between said comparator circuit means and said prime mover means, applying a second command signal to said prime mover means prior to said first recited command signal to slow advancement of said head blocks.

15. The setworks as defined by claim 14 wherein said selector circuit means comprises a plurality of voltage divider networks coupled across a DC voltage source of first polarity, each having an adjustable voltage tap and a manually operable selector switch having a plurality of fixed switch contacts respectively connected to the plurality of voltage taps and a movable switch contact coupled to said comparator circuit means and said summing circuit means, and wherein said second circuit means comprises a potentiometer coupled across a DC voltage of opposite polarity and having an adjustable voltage tap coupled to said summing circuit means.

16. The setworks as defined by claim 14 and additionally including fourth circuit means providing a third DC signal, said third DC signal being selectively adjustable and of either polarity, and second summing circuit means coupled to said selector circuit means and said fourth circuit means providing said third DC signal and being operable to provide a second reference signal coupled to said comparator circuit means which is the algebraic sum of said selected second DC output signal and said third DC signal wherein said comparator circuit provides said control output signal when said DC output signal from said means providing said electrical analog signal equals said second reference signal.

17. The setworks as defined by claim 16 and additionally including buffer amplifier means coupled between said first and second summing circuit means and said comparator circuit means.

18. The setworks as defined by claim 17 wherein said first summing circuit includes a summing point and additionally including respective resistance means coupled from said selector circuit means, said second circuit means and said fourth circuit means to said summing point, and wherein said summing circuit means includes another summing point and additionally including respective resistance means coupled from said selector circuit means and said second circuit means to said another summing point.

19. The apparatus as defined by claim 18 and additionally including operational amplifier circuit means respectively coupled between said first and second summing point to said comparator circuit.

20. The invention as defined by claim 13 and additionally including an amplifier means having predetermined gain coupled between said means providing said electrical analog signal and said switch means.

* * * * *